United States Patent
Benson et al.

(10) Patent No.: US 6,589,472 B1
(45) Date of Patent: Jul. 8, 2003

(54) METHOD OF MOLDING USING A THERMOPLASTIC CONFORMAL MANDREL

(75) Inventors: Ross A. Benson, Willow Park, TX (US); Todd H. Ashton, Ft. Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 126 days.

(21) Appl. No.: 09/871,295

(22) Filed: May 31, 2001

Related U.S. Application Data

(60) Provisional application No. 60/232,772, filed on Sep. 15, 2000.

(51) Int. Cl.[7] ............................................. B29C 70/44
(52) U.S. Cl. ....................... 264/510; 264/511; 264/512; 264/257; 264/258; 264/313; 264/314; 264/317; 264/322
(58) Field of Search ................. 264/510, 511, 264/512, 257, 258, 313, 314, 315, 316, 317, 322

(56) References Cited

U.S. PATENT DOCUMENTS

| | | | | |
|---|---|---|---|---|
| 4,311,661 A | * | 1/1982 | Palmer ........................ | 264/510 |
| 4,853,172 A | * | 8/1989 | Jacaruso et al. ............ | 264/571 |
| 5,217,669 A | * | 6/1993 | Dublinski et al. .......... | 264/258 |
| 5,262,121 A | | 11/1993 | Goodno ................. | 264/571.25 |
| 5,366,684 A | * | 11/1994 | Corneau, Jr. ................. | 264/510 |
| 5,368,807 A | | 11/1994 | Lindsay ...................... | 264/510 |
| 5,439,635 A | * | 8/1995 | Seemann ..................... | 264/510 |
| 5,484,277 A | * | 1/1996 | Lindsay ...................... | 425/388 |
| 5,593,633 A | * | 1/1997 | Dull et al. .................. | 264/510 |
| 5,707,576 A | * | 1/1998 | Asher ......................... | 264/258 |
| 5,853,651 A | * | 12/1998 | Lindsay et al. ............. | 364/512 |
| 5,902,535 A | | 5/1999 | Burgess et al. ............. | 264/257 |
| 6,012,883 A | | 1/2000 | Engwall et al. ............. | 409/132 |
| 6,077,066 A | | 6/2000 | Hanusiak et al. ........ | 425/405.1 |
| 6,083,448 A | * | 7/2000 | Henrio ........................ | 264/511 |
| 6,110,407 A | | 8/2000 | Murphy ...................... | 264/219 |
| 6,143,236 A | | 11/2000 | Nelson et al. .............. | 264/552 |
| 6,361,840 B2 | * | 3/2002 | Nelson et al. ............. | 428/35.2 |
| 6,391,246 B2 | * | 5/2002 | Shiraishi et al. ............ | 264/510 |
| 6,458,309 B1 | * | 10/2002 | Allen et al. ................. | 264/319 |

FOREIGN PATENT DOCUMENTS

| | | |
|---|---|---|
| WO | 9737725 | 10/1997 |

* cited by examiner

*Primary Examiner*—Stefan Staicovici
(74) *Attorney, Agent, or Firm*—Jeffrey S. Whittle

(57) ABSTRACT

A thermoplastic conformal tool/vacuum bag that is structured to substantially conform to a surface or a cavity in a composite structure is placed proximate to a uncured composite member to fabricate a composite structure. External heat and external pressure are applied to cure the member. The conformal thermoplastic tool/vacuum bag is removed from the cured assembly by reheating, if necessary, to facilitate removal of the tool/vacuum bag.

12 Claims, 7 Drawing Sheets

METHOD OF MOLDING USING A THERMOPLASTIC CONFORMAL MANDREL

CROSS-REFERENCE TO RELATED APPLICATION

This application claims the benefits of prior provisional patent application having U.S. Ser. No. 60/232,772, filed Sep. 15, 2000.

BACKGROUND OF THE INVENTION

1. Technical Field

This invention relates to a method for fabricating a composite structure. More particularly, this invention relates to a method of using molded, rigid thermoplastics to create a conformal vacuum bag/temporary tool (mandrel) for fastenerless assembly and curing of composite structures.

2. Background of the Invention

Composite materials comprising a fiber-reinforced resin matrix are often used to fabricate lightweight, high strength parts such as vertical and horizontal stabilizers for aircraft. Optimized designs for these types of parts will typically involve geometries that cause the internal tooling to become trapped upon cure. Fabrication of composite parts with trapped geometries typically includes use of a solid mandrel having an exterior shape generally conforming to the desired interior shape of the part. Uncured composite materials are then laid up on the mandrel and cured by applying heat and pressure according to well-known methods.

To address the problem of mandrel removal, industry presently uses one of two basic mandrel types: 1) segmented metal, or; 2) expendable.

Reusable segmented metal mandrels have been used with a wide variety of geometries and sizes. They are extracted from a cured structure by disassembling the mandrel and removing it piece by piece. These mandrels are very costly and present handling problems due to their extreme weight and complexity, and because they are somewhat damage-prone.

Expendable mandrels are typically made of plaster, water soluble eutectic salts or even eutectic metals. In the case of plaster, it is removed by breaking it away from the part using impact devices after the composite part has been cured in an oven or autoclave. The broken plaster pieces are then discarded at a significant cost to the manufacturer. The use of breakaway plaster is labor intensive, can result in irreparable damage to cured composite parts, and produces large quantities of waste which are costly to dispose of.

The use of eutectic salts or metals may be environmentally hazardous, and although some percentage may be recoverable, recovery is not cost effective in many cases due to contamination and/or degradation of the material. These materials also tend to fuse to, and therefore contaminate the interior surface of a structure, making it necessary to provide a reliable barrier, which also needs to be subsequently removed. These mandrels are heavy, particularly those made with eutectic metals. Salt mandrels are comparatively fragile, therefore the handling of heavy and/or fragile mandrels presents yet another drawback.

All four types are unsuitable for co-bonded structures because they do not allow direct application of outward pressure to the interior surfaces. Instead, pressure is applied only to the outside, requiring the outer surfaces and tooling to move inward. While this method does provide accurate interior mold lines, it is difficult to control outer mold line contours and it becomes equally challenging to maintain distortion-free fiber alignment. The substantial thermal mass associated with these materials presents yet another complication when the time comes to quickly and uniformly heat the structure during cure. This heat-up lag can increase the risk of having to scrap a structure by simply forcing the cure process to go beyond its acceptable, specified parameters.

Expandable elastomeric soft tooling has occasionally been used as part of the bagging envelope in specific types of composite structure fabrication. In these cases, it is used to apply pressure to interior surfaces. One such process utilizes an expandable tool where pressure is applied to the interior of the tooling and expanded to force the uncured composite material to conform and consolidate against the surfaces of an external tool. These mandrels are limited to simple design configurations in which dimensional control of the part's internal surfaces part is not critical. While this system does address the problem of consolidating internal elements of a composite structure such as those encountered in co-bonded assemblies, its flexible nature cannot provide a rigid backbone upon which these various elements can be located or assembled prior to cure. Complex and cumbersome tooling must therefore be used for that purpose. As a result, non-recurring and recurring costs increase due to the additional tooling required and/or the complications arising from having to extract tooling prior to cure, or from having to bag around these tooling elements. It is difficult for these mandrels to achieve uniform pressure distribution across the laminate during a cure cycle. Finally, elastomeric soft tooling is limited in its ability to be extracted intact from severely trapped areas. It is comparatively expensive, easily damaged and the elastomer itself cannot withstand more than a few cure cycles before having to be replaced.

Traditional bagging systems, such as nylon film, also typically require tooling to support the interior cavities. In addition, these systems are difficult to conform to, and be extracted from, complex geometry. The film has a tendency to bridge over corners, increasing the risk of bag failure considerably during autoclave cure. This usually results in a poorly consolidated laminate which will have to be scrapped. Although tooling is typically added to minimize this risk, it becomes a labor intensive remedy.

Hence, the need exists for a method/tooling material which will facilitate fabrication of trapped geometry composite structure while minimizing the aforementioned costs and risks. At room temperature, it would need to act as a rigid mandrel during lay-up and assembly of a structure. When the time comes to cure that structure, however, it would have to behave in quite a different manner: that of a highly flexible, yet inherently reliable vacuum bag. A tool is needed that will provide support to the composite structure during assembly, consolidate the laminate during cure, and yet, become safely and easily removable from the structure after it is cured. The present invention meets these needs.

SUMMARY OF THE INVENTION

In this invention, a method of fabricating composite structure is provided that uses thermoplastics to create conformal vacuum bag/temporary tool. This tool can accurately locate and provides support to at least a portion of elements within a composite structure prior to cure and yet provide improved pressure distribution during the cure by functioning as a high integrity vacuum bag. The thermoplastic conformal tool/vacuum bag is designed to conform or fit closely to internal surfaces or cavities of a composite structure. Such surfaces or cavities would typically consist of a closed (i.e., trapped) geometry. Some, if not all, of the elements in the structure may be uncured when assembled and placed into the cure tool or fixture. Although the conformal tool becomes trapped in such geometry upon cure, it can be easily removed by reheating the cured composite assembly to an intermediate temperature. This softens the material to a point at which it will readily collapse and allow it to be easily withdrawn, regardless of the geometric complexity of the structure.

The method of fabricating a composite structure using a thermoplastic conformal tool/vacuum bag of this invention comprises the steps: of preparing a rigid thermoplastic conformal tool/vacuum bag to dimensions that substantially conform to a surface or a cavity of a composite structure; placing the thermoplastic conformal tool/vacuum bag and uncured composite members in contact with each other to form an assembly; applying external heat and external pressure to the assembly for sufficient time to cure the composite member; and removing the thermoplastic conformal tool/vacuum bag from the assembly, whereby a cured composite structure is fabricated. Also, the volume of the assembly is reduced to form a debulked assembly, if needed.

Elements of the structure are located on the conformal tool according to predetermined geometries and recesses that were previously molded into the tool. External elements and/or tooling are placed around the assembly and covered by a vacuum bag. The external vacuum bag is sealed to the end(s) of the conformal tool(s) Heat and pressure are applied for a sufficient time to cure the assembly. External bagging and tooling are removed, and the cured structure is then reheated to permit collapse and extraction of the softened tool/bag.

BRIEF DESCRIPTION OF THE DRAWINGS

The invention briefly summarized above may be understood in more detail by reference to the embodiments illustrated in the appended drawings which form a part of this specification. It is to be noted, however, that the drawings illustrate only a preferred embodiment of the invention and therefore is not to be considered limiting of its scope as the invention may admit to other equally effective embodiments.

DESCRIPTION OF THE PREFERRED EMBODIMENT

The present invention is directed to an improved method for fabricating a composite structure for, but not limited to, aircraft. As used herein, the phrase "substantially conforms" is intended to mean a shape or geometry whose dimensions approximate a surface or cavity of a composite structure or member. The phrases "tool/vacuum bag" and "mandrel" are used interchangeably.

Figure 1:
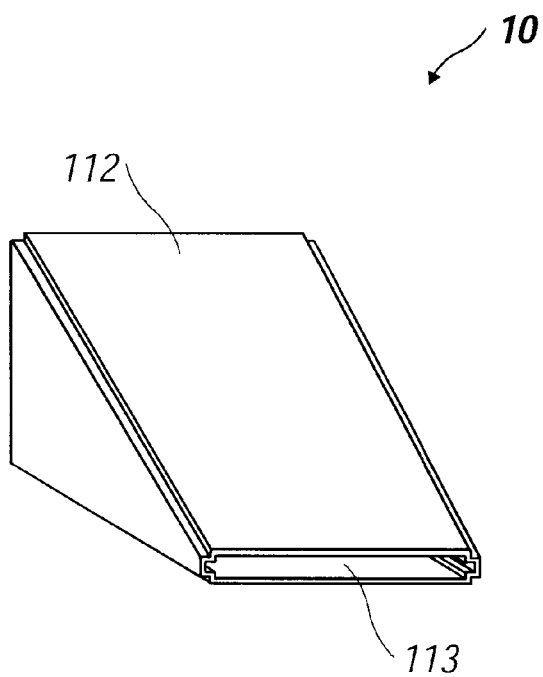
FIG. 1 is a perspective view of a representative thermoplastic conformal tool/vacuum bag in accordance with this invention.

Referring now to FIG. 1, a perspective view 10 of one embodiment of a thermoplastic conformal tool/vacuum bag is shown. Thermoplastic conformal tool/vacuum bag 112 is a core member in this embodiment, structured to dimensions that substantially conform to a surface or cavity of a composite structure. Tool/vacuum bag 112 is rigid and hollow to provide support to at least a portion of the composite structure and to provide outward pressure distribution while the composite is being cured. In this example, tool/vacuum bag 112 has a substantially triangular longitudinal cross-section and is generally wedge-shaped. Tool/vacuum bag 112 has thin rectangular opening 113 into its interior to allow entry of autoclave pressure.

Figure 2:
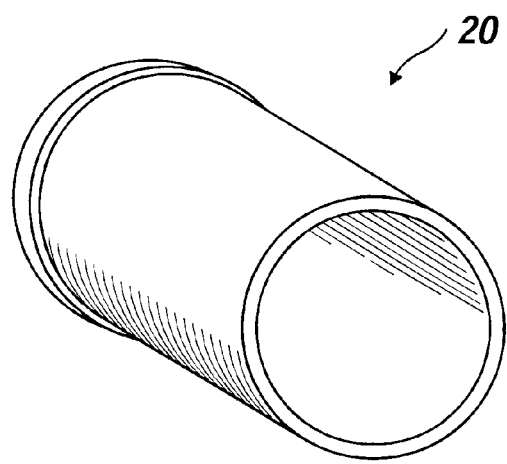
FIG. 2 illustrates the thermoplastic member of FIG. 1 prior to being thermo-formed into a conformal tool/vacuum bag of this invention.

Tool/vacuum bag 112 may be prepared from conventional thermoplastic materials such as acrylonitrile-butadiene-styrene (ABS) thermoplastic resin. In the embodiment of FIG. 1, tool/vacuum bag 112 is fabricated from thermoplastic member 20, shown as a tube 20 in FIG. 2. Tool/vacuum bag 112 is fabricated via conventional means, such as blow molding, vacuum-forming, rotational molding or the like.

Figure 7:
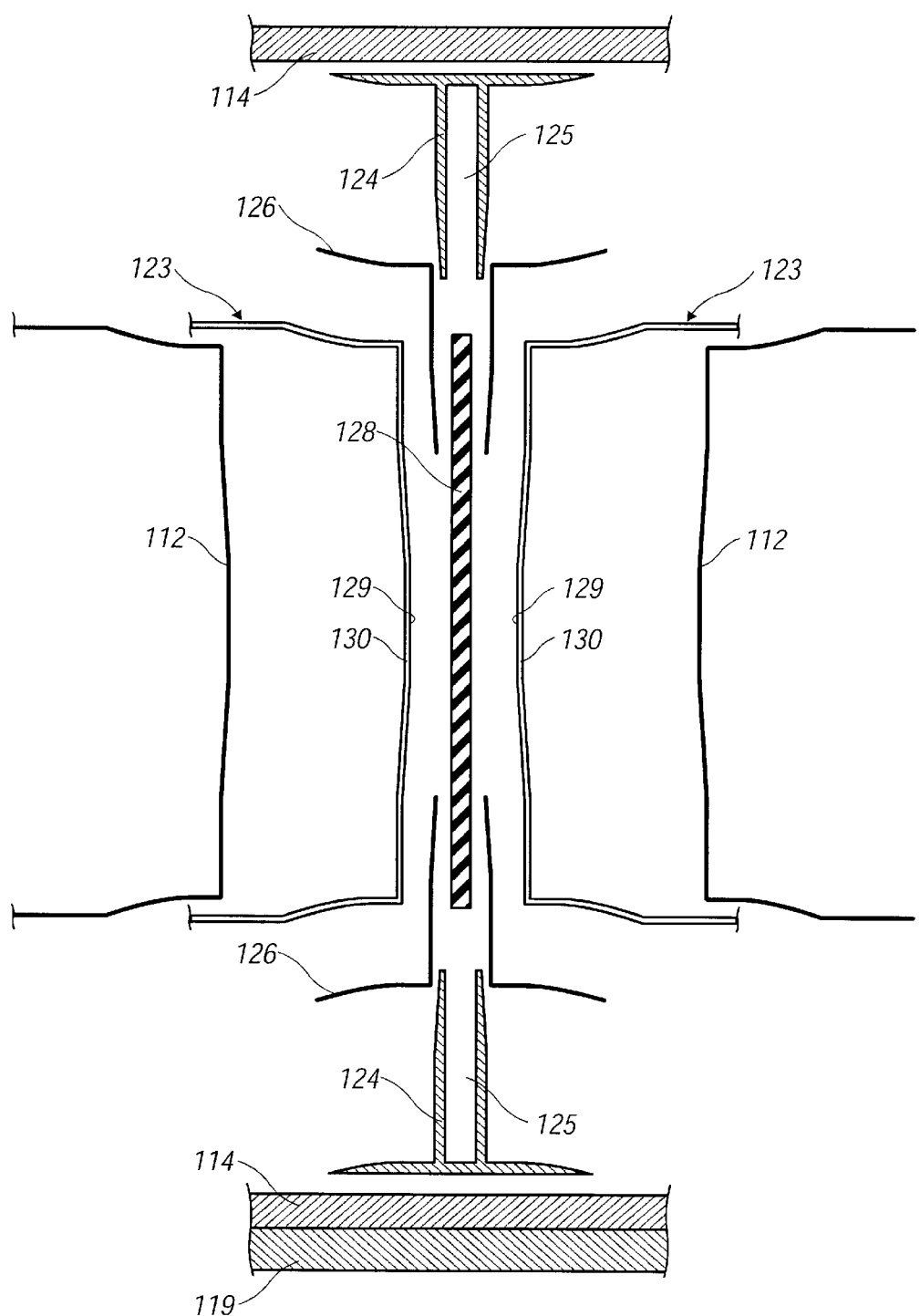
FIG. 7 is an enlarged exploded, partial cross-sectional view of the thermoplastic conformal tool/vacuum bag assembly as shown in FIG. 6.

As shown in FIG. 7, a liner 123 is wrapped around each tool/vacuum bag 112 prior to its use as a locating tool. Liner 123 may include a film 129 and a vent cloth 130. Film barrier 129, preferably TEFLON®film, is used to facilitate removal of tool/vacuum bag 112. Porous vent cloth 130 is used to provide a pathway for volatile vapors and gases to escape the assembly while the composite is being cured. Vent cloth 130 may be a felt or fabric material.

Figure 3:
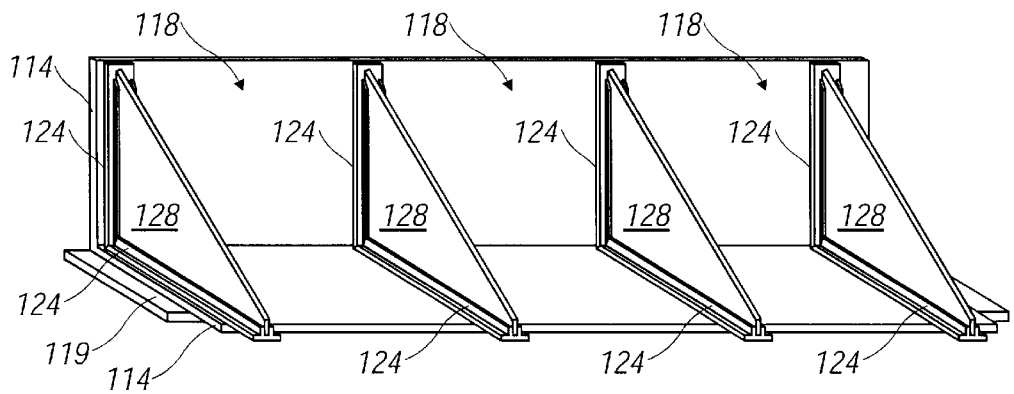
FIG. 3 illustrates the intended partial assembly of composite members. Actual assembly of these members will be accomplished using the conformal tool/vacuum bag of FIG. 1, as subsequently described.

For purposes of clarity, FIG. 3 shows a partial assembly of composite members only. During actual assembly and cure, the thermoplastic conformal tool/vacuum bag would be occupying the cavity 118. One or more composite skin elements 114, which are flat plates, are placed on a lay-up table 119. A plurality of uncured composite joint members 124 are placed around the triangular, flat web members 128. Each joint member 124 is preferably formed of a woven fabric strip and contains a resin matrix.

Figure 4:
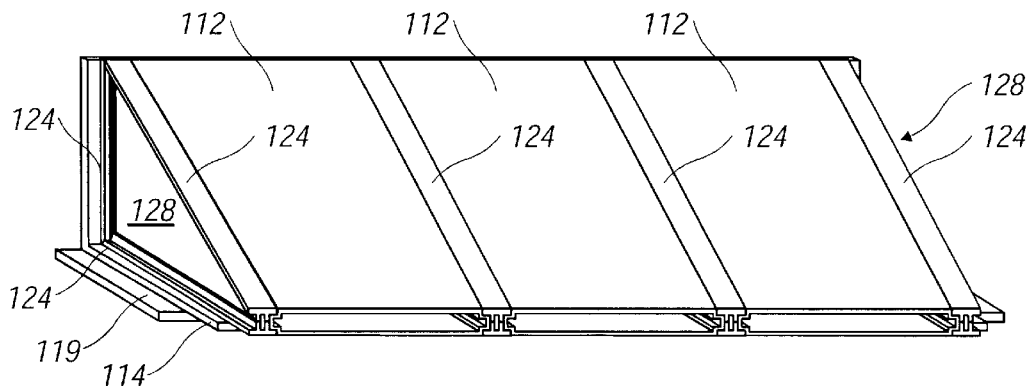
FIG. 4 illustrates the assembly of composite members of FIG. 3 utilizing several thermoplastic members of FIG. 1 as locating tools or fixtures.
Figure 5:
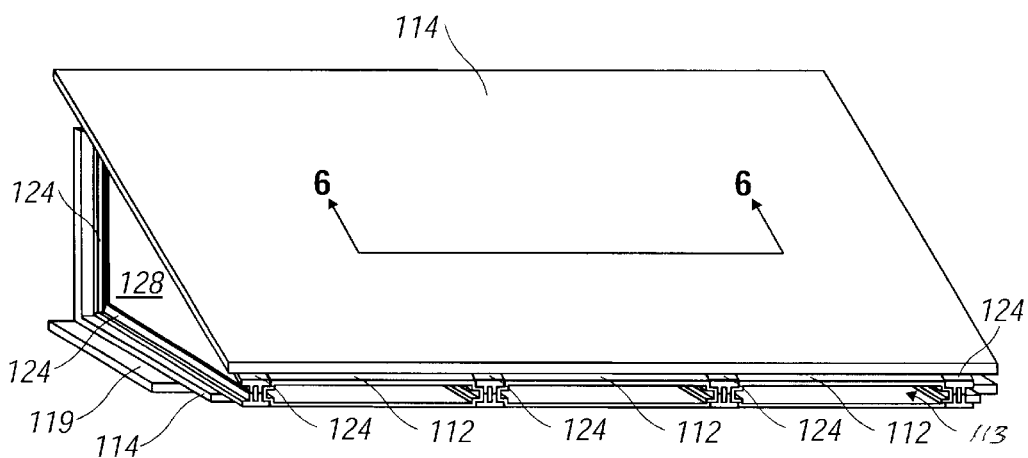
FIG. 5 illustrates a completed assembly of the composite members of FIG. 4 and several conformal tools/vacuum bags of FIG. 1.

The assembled joint members 124/web members 128 are located onto the recessed edges of tool/vacuum bag 112. A plurality of assemblies (112/124/128) are placed onto skin element 114 at spaced intervals determined principally by tool/vacuum bag 112, as shown in FIG. 4. Each tool/vacuum bag 112 is structured to dimensions that substantially conform to the intended cavity 118 as noted above. A second skin element 114 is placed over the previously assembled elements to complete the uncured structure, as shown in FIG. 5. Skin 114 may be either cured or uncured, but in an preferred embodiment of the invention, it is already cured to provide the desired configuration and dimensional tolerances in order to simplify the assembly tooling that is required. Also shown in FIG. 5, the upper and lower skins 114 do not join each other at the narrow ends, leaving openings 113 at each cavity 118. The cross-sectional geometry of cavity 118 depends on the particular geometry of composite structure to be cured. In the embodiment of FIGS. 1–8, the cross-sectional geometry of cavity 118 is substantially rectangular in shape.

Figure 6:
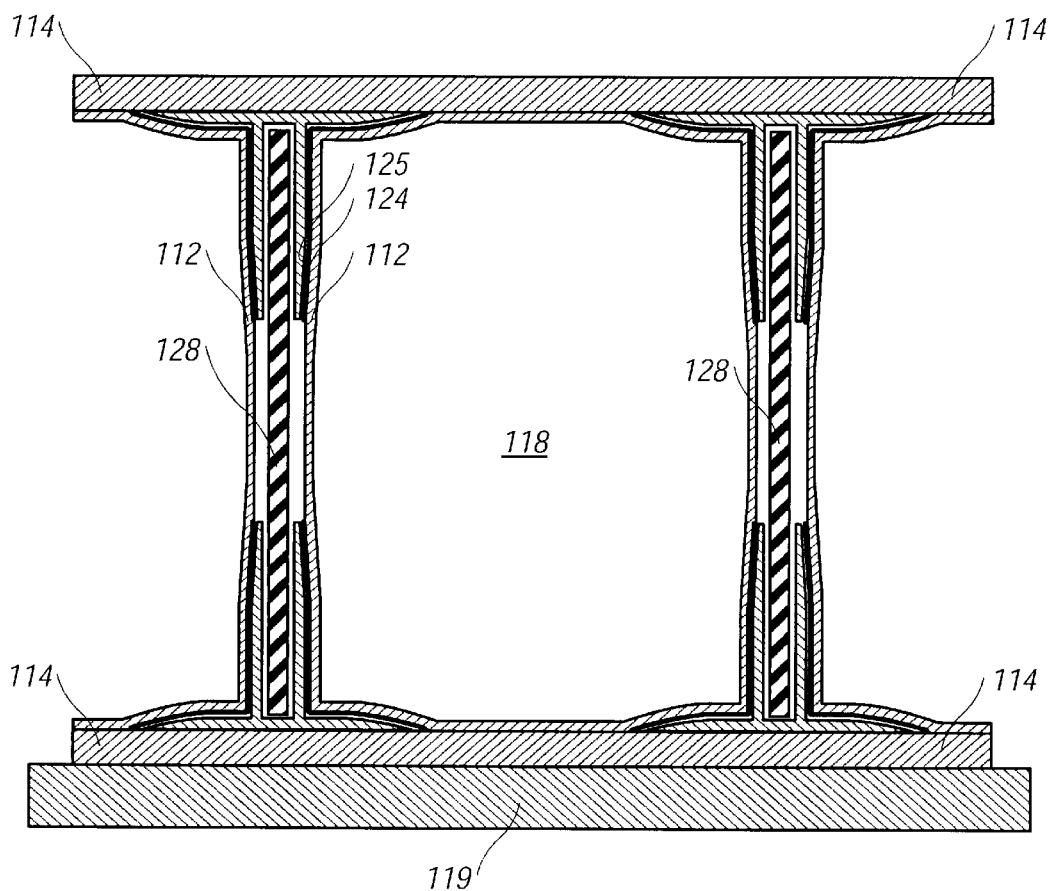
FIG. 6 is an enlarged cross-sectional view of a portion of the thermoplastic conformal tool/vacuum bag assembly of FIG. 5, taken along lines 6—6 of FIG. 5.
Figure 8:
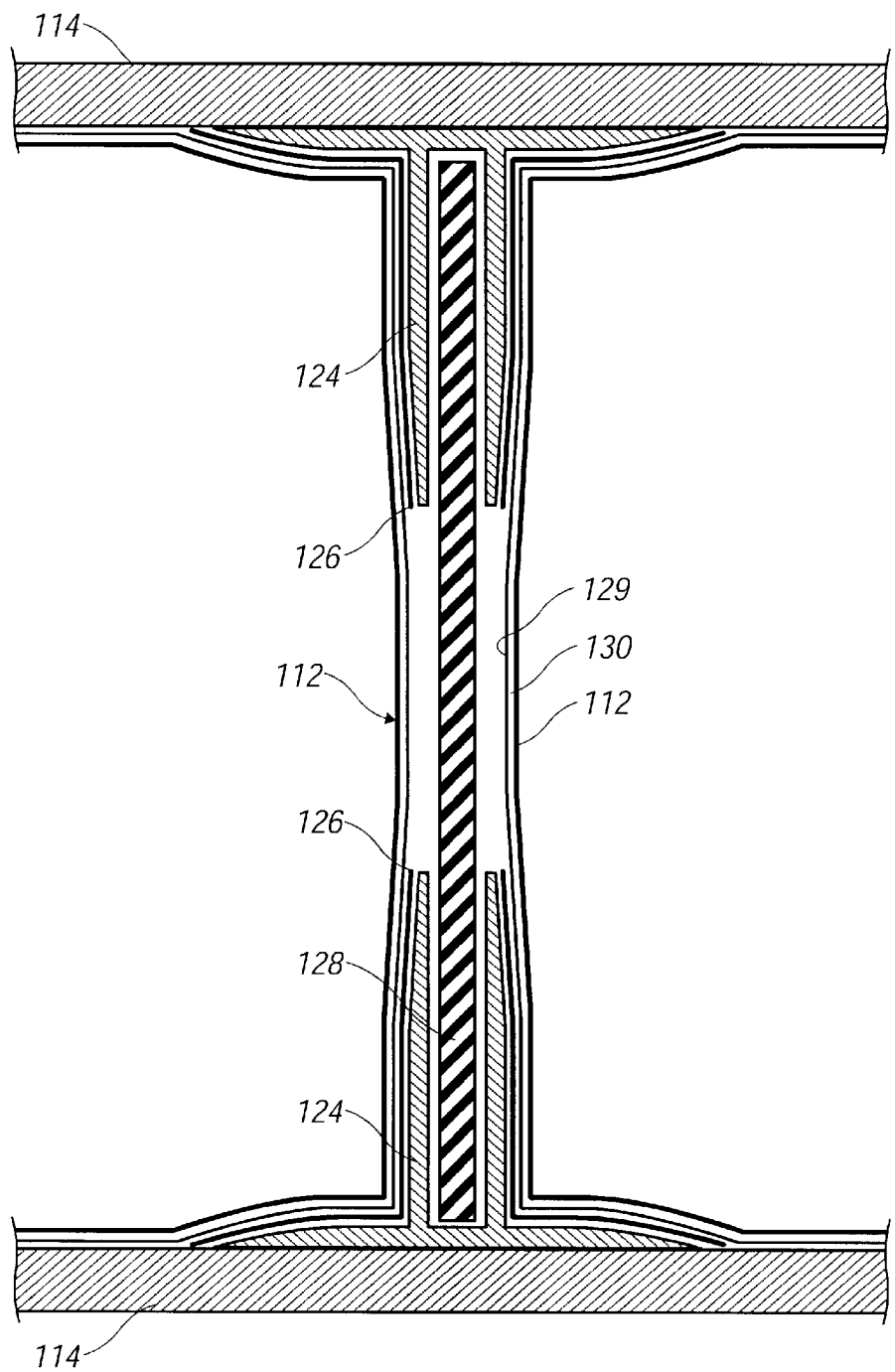
FIG. 8 is an enlarged cross-sectional view of a portion of the thermoplastic conformal tool/vacuum bag assembly as shown in FIG. 6, after it has been debulked and is ready to be placed in an oven or autoclave for curing.

Referring to FIGS. 6–8, preferably, composite joint member 124 is an uncured composite whose shape resembles, but is not limited to, the Greek letter Π or "pi" and has a longitudinal crossbar or base with two longitudinal legs extending therefrom. A groove or channel 125 is defined between the two legs. Web 128 is placed into channels 125 of the uncured composite joint member 124. The two legs of the uncured composite joint member 124 closely receive and straddle the thickness of the web 128. Web 128 may be a cured or uncured composite material. Also web 128 may be fabricated from metal. The composite joint member 124 and web 128 are treated with a thermoset resin, such as an epoxy, to provide a bonding medium for these materials during cure. An overwrap 126 (FIG. 7) may be applied over composite joint member 124 to be joined to improve bond strength between the member 124 and web 128. The overwrap is an uncured laminating material such as a woven cloth or reinforcing fiber that may have laminating resin, such as epoxy, impregnated therein. Overwrap 126 maybe placed on composite joint member 124, extending from skin 114 to web 128.

After the skins 114, composite joint members 124, webs 128, and tool/vacuum bags 112 are assembled and sealed to an external vacuum bag, the assembly may be debulked to compact and/or reduce the volume of the composite structure. Debulking is a conventional process which comprises drawing a vacuum between composite members. A vacuum fitting pierces and seals into an appropriate portion of the external vacuum bag which envelopes the assembly. A vacuum hose is attached to the fitting and vacuum is drawn on the entire assembly. As shown in FIG. 8, the sides of tool/vacuum bag 112 expand outward, compressing composite members 124 and pressing tightly against webs 128 and skins 114. This debulking procedure is well known to those skilled in the art.

While retaining the vacuum, the assembly shown in FIG. 8, is placed in an oven or autoclave and heated according to a thermal profile suitable for curing the composite joint member 124. Structural bonds are thereby created that integrally link composite joint members 124 to webs 128 and skins 114 to fabricate the desired composite structure. If required, autoclave pressure is simultaneously applied to augment compaction of the composite while it is being cured.

External heat and pressure is applied to the debulked assembly according to a temperature and pressure profile appropriate for the thermosetting resin used. In the case of epoxy laminating resins that are used in most aerospace applications, the temperature for cure is generally about 350° F. However, for the thermoplastic conformal tool/vacuum bag to soften and consolidate the laminate under pressure, the temperature should be at least about 30 to 50° F. above the VICAT softening point (a standard ASTM test) of the particular thermoplastic material. For ABS thermoplastic resin, this ranges from 210 to 320° F. The external pressure applied can range from atmospheric (14 psia) to 200 psig, however 90 to 100 psig is more commonly used. The curing process creates structural bonds that integrally link the composite to the web members and skin.

Following completion of the required cure cycle, the external vacuum bag and tooling, if any, are removed, yielding a completed cured assembly. The assembly is then re-heated in an oven to a temperature below that which was reached during final cure, but high enough to cause the conformal tools/vacuum bags 112 to re-soften and collapse. At this point, they are easily removed by pulling them outward through openings 113 (FIG. 5) and the thermoplastic material is subsequently recycled or discarded. For ABS thermoplastic resin, the re-heat temperature will preferably range from 285 to 320° F.

Figure 9:
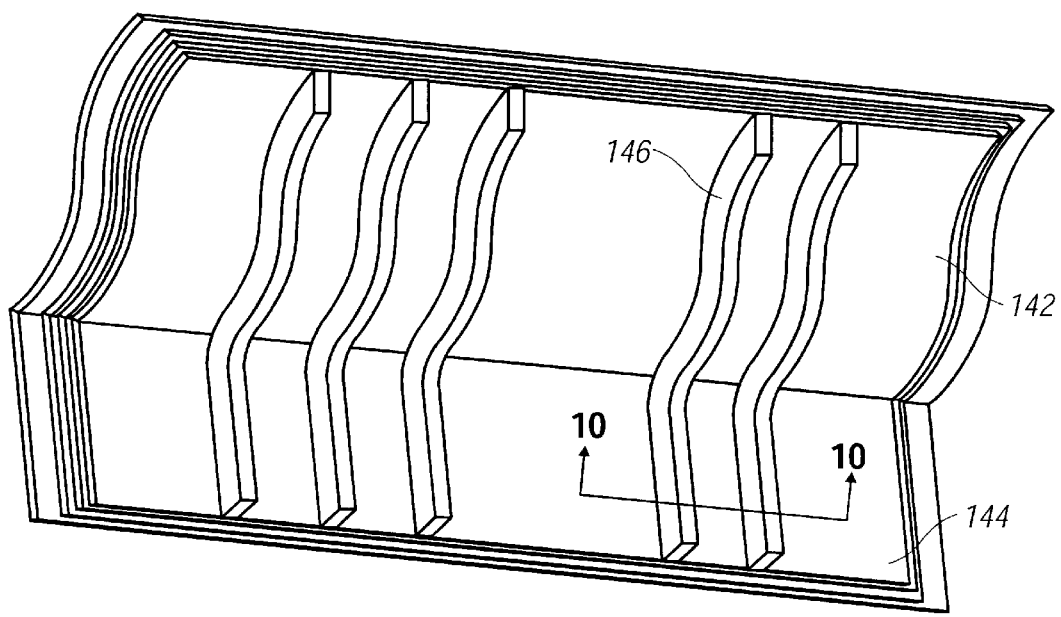
FIG. 9 illustrates another embodiment of a thermoplastic conformal tool/vacuum bag in accordance with this invention. In this embodiment, the invention becomes an external vacuum bag with self-locating features, thereby facilitating the bagging of complicated geometries.
Figure 10:
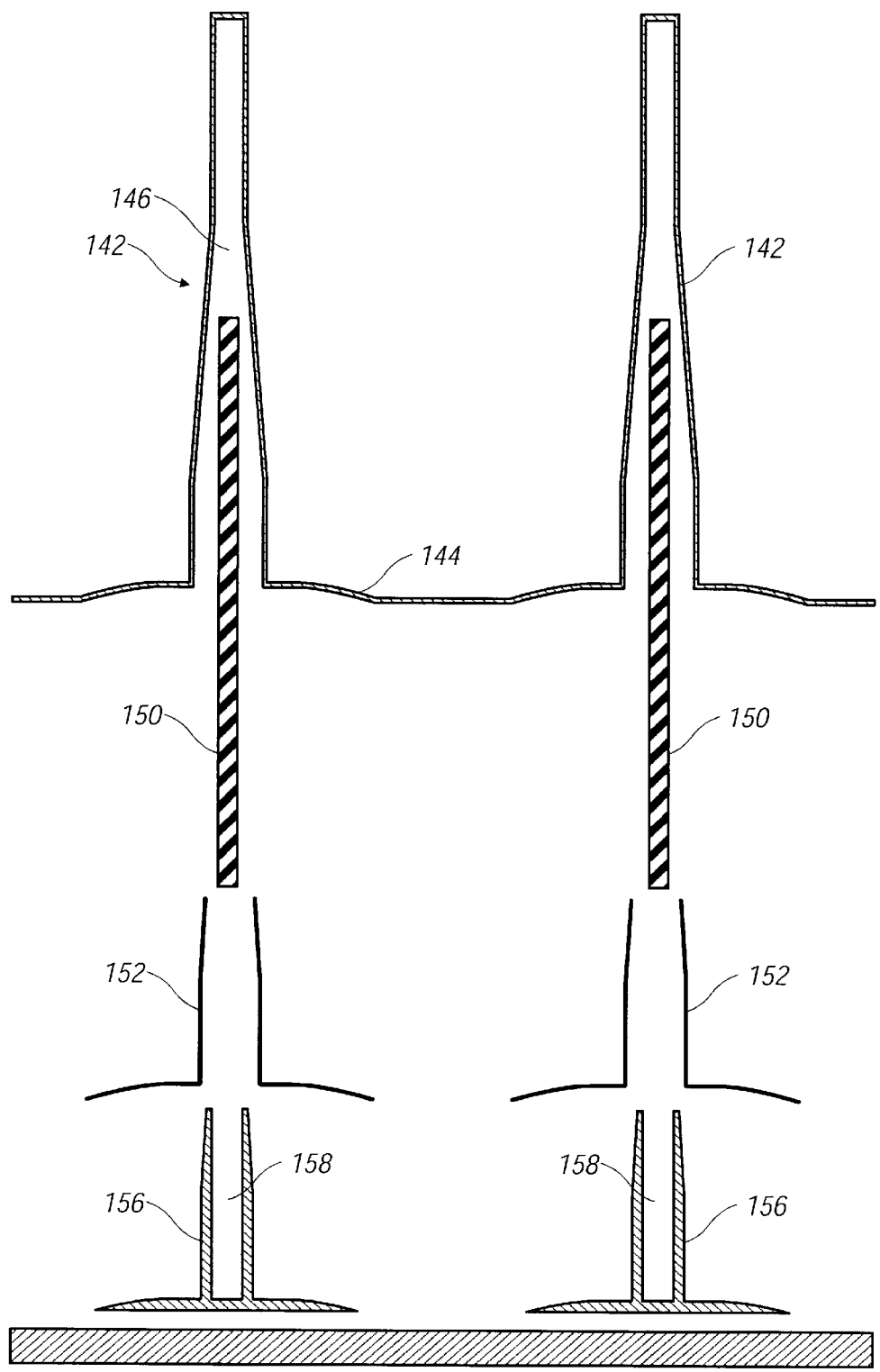
FIG. 10 is an exploded enlarged view of a portion of the thermoplastic conformal tool/vacuum bag of FIG. 9 taken along lines 10—10 of FIG. 9.

The thermoplastic conformal tool/vacuum bag of this invention also serves as a locating tool in most applications. FIG. 9 is an isometric view of another preferred embodiment of the thermoplastic conformal tool/vacuum bag 142 of this invention. The geometric form of tool/vacuum bag 142 provides the function of locating and/or orienting the composite elements during lay-up and cure, particularly for highly contoured skin members or hat stiffeners (not shown). Tool/vacuum bag 142 has a base portion 144 and a plurality of hollow channels 146 extending outwardly from base portion 144. Base portion 144 has a straight section and a curved section. As shown in FIG. 10, a blade stiffener 150 is placed within a channel 158 of a composite joint member 156 that is similar to joint member 124 of FIGS. 1–8. Joint member 156 may be treated with a thermosettable resin. An overwrap 152 may be placed over at least a portion of each blade 150 and composite joint member 156. These subassemblies are placed into the channels 146 of tool/vacuum bag 142 which is then placed and sealed onto a cure tool. In doing this, tool/vacuum bag 142 simplifies location and/or orientation of the structures during assembly and then functions as a vacuum bag for debulking and cure, as discussed above.

The invention has significant advantages. The method of this invention is designed to reduce tooling and production costs, while improving reliability (i.e., fewer tool/vacuum bag failures). In this method, pressure distribution in the tool/vacuum bag is improved and bridging is significantly reduced or eliminated during cure of composite structures at 350° F./100 psig. Additionally, this method allows for greatly simplified removal of tool/vacuum bags in difficult geometry, i.e., inner trapped locations. The thermoplastic conformal tool/vacuum bag is rigid at room temperature and may be used to build or lay up the composite members, i.e., temporary tooling that supports parts or materials during fabrication until completely ready for cure. The tool/vacuum bag of this invention may be thermnally formed to any desired shape based on the geometry of the composite structure. The thermoplastic conformal tool/vacuum bag re-forms during the consolidation process of cure and then collapses when re-heated for easy removal from trapped geometries. The most significant cost benefit of this invention, however, is that it enables the fabricator to greatly reduce the number of fasteners used in typical composite structure assemblies and do so in a simplified manner.

While the invention has been shown in only a few of its forms, it should be apparent to those skilled in the art that it is not so limited, but susceptible to various changes without departing from the scope of the invention. The scope of this invention is to be defined by the following claims.

We claim:

1. A method of fabricating a composite structure using a thermoplastic conformal tool/vacuum bag, comprising the steps of:

(a) preparing a rigid thermoplastic conformal tool/vacuum bag having a first shape to substantially conform to dimensions of a surface or a cavity of a composite structure, the surface or cavity of the composite structure having a second shape different from the first shape;

(b) placing the thermoplastic conformal tool/vacuum bag and an uncured composite member in contact with each other to form an assembly;

(c) applying external heat and external pressure to the assembly for sufficient time to cure the composite member and thereby define a cured composite structure;

(d) removing the thermoplastic conformal tool/vacuum bag from the assembly, whereby the cured composite structure is fabricated; and (e) re-heating the assembly sufficiently to soften the thermoplastic conformal tool/vacuum bag to thereby cause the thermoplastic conformal tool/vacuum bag to collapse and become removable.

2. The method of claim 1, wherein the step of preparing includes fabricating the thermoplastic conformal tool/vacuum bag, wherein the first shape is tubular, and the method further comprises the step of reducing volume of the assembly to form a debulked assembly.

3. The method of claim 1, wherein the thermoplastic conformal tool/vacuum bag is a core member having a hollow interior and outer surfaces surrounding the hollow interior on at least five sides thereof, and wherein the composite member is laid up over the conformal tool/vacuum bag.

4. The method of claim 1 wherein the applying step includes heating the assembly to a temperature of about 300 to 400° F. and supplying pressure to the assembly of about 14 psia to 200 psig.

5. The method of claim 1 wherein the removing step includes removing the conformal tool/vacuum bag after the assembly has cooled to less than about 300° F.

6. The method of claim 1 wherein the step of re-heating the assembly includes re-heating the assembly to above about 300° F. to remove the thermoplastic conformal tool/vacuum bag.

7. The method of claim 1 wherein step (a) includes placing a film barrier and a porous vent cloth between the tool/vacuum bag and the uncured composite member.

8. A method of assembling and curing a composite structure using a thermoplastic conformal tool/vacuum bag, comprising the steps of:

a) forming a plurality of hollow and rigid thermoplastic conformal tool/vacuum bags each having a first shape to dimensions of a surface or a cavity of a composite assembly, the surface or cavity of the composite structure having a second shape different from the first shape;

b) enclosing the plurality of hollow, rigid thermoplastic conformal tool/vacuum bags with uncured portions of a composite assembly, each tool/vacuum bag being structured to dimensions that substantially conform to a cavity of the composite assembly;

c) heating the assembly and the enclosed tool/vacuum bags to cure the uncured portion of the composite assembly; and d) removing the thermoplastic conformal tool/vacuum bags from the cavities of the composite assembly, the removing step including re-heating the assembly sufficiently to soften the tool/vacuum bags, causing them to collapse and become removable.

9. The method of claim 8, wherein the step of forming includes fabricating the thermoplastic conformal tool/vacuum bag, wherein the first shape is tubular, and the method further comprises after step (b) and before step (d) reducing the volume of the assembly to form a debulked assembly.

10. The method of claim 8, wherein the thermoplastic conformal tool/vacuum bag is a core member having a hollow interior and outer surfaces surrounding the hollow interior on at least five sides thereof, wherein the composite member is laid up over the conformal tool/vacuum bag, and wherein step (c) includes applying pressure of about 14 psia to 200 psig.

11. A method of assembling and curing a composite structure in a thermoplastic conformal tool/vacuum bag, comprising the steps of:

a) placing uncured portions of a composite member in contact with a rigid thermoplastic conformal tool/vacuum bag having a base portion and a plurality of hollow recesses extending outwardly from the base portion;

b) drawing a vacuum between the composite member and the conformal tool/vacuum bag to form a debulked assembly;

c) heating and pressurizing the debulked assembly to about 300 to 400° F. and about 14 psia to 200 psig, respectively to form a cured assembly;

d) after curing of the composite member, re-heating the assembly sufficiently to soften the tool/vacuum bags to causing them to collapse and become removable; and (e) removing the collapsed thermoplastic conformal tool/vacuum bags from the cured assembly.

12. A method of assembling and curing a composite structure using a thermoplastic conformal tool/vacuum bag, comprising the steps of:

a) enclosing a plurality of hollow, rigid thermoplastic conformal tool/vacuum bags with uncured portions of a composite assembly, each tool/vacuum bag being structured to dimensions that substantially conform to a cavity of the composite assembly;

b) heating the assembly and the enclosed tool/vacuum bags to cure the uncured portion of the composite assembly; and c) removing the thermoplastic conformal tool/vacuum bags from the cavities of the composite assembly, the removing including re-heating the assembly sufficiently to soften the tool/vacuum bags, causing them to collapse and become removable.

* * * * *